United States Patent Office 2,768,151
Patented Oct. 23, 1956

2,768,151

METHACRYLONITRILE POLYMERS HEAT STABILIZED WITH ORGANIC HALOGEN COMPOUNDS

Roger M. Schulken, Jr., and Harmon Long, Kingsport, Tenn., assignors to Eastman Kodak Company, Rochester, N. Y., a corporation of New Jersey No Drawing. Application February 23, 1954,
Serial No. 412,056

6 Claims. (Cl. 260—45.85)

This invention relates to methacrylonitrile polymers stabilized to heat, and more particularly to methacrylonitrile polymers containing a relatively small amount of certain organic compounds to prevent discoloration of said polymers in molding processes.

Methacrylonitrile polymers are known to have outstanding properties which make them potentially valuable as injection, extrusion and compression molding materials. However, they also have the undesirable property of turning yellow to brown, and even black in some cases, when molded to shaped articles by any of the usual molding processes employing temperatures in the range of about from 150° to 250° C. Accordingly, methacrylonitrile polymers without stabilizers are greatly limited in their commercial applications.

We have now found that by incorporating small amounts of 1, 2, 3-tribromopropane, alpha-bromobutyric acid, 2-bromoethyl acetate or beta-chloropropionitrile or mixtures of any two or more of these compounds with methacrylonitrile polymers, i. e. homopolymers or copolymers of methacrylonitrile, the resulting compositions show no breakdown and remain completely colorless and clear on heating for much longer periods of time than the same resins without these stabilizers. This advantageous result is also obtained in the actual molding operation. The above stabilizers are particularly effective in preventing the early formation of a yellow color in the resin. This result is surprising because most of the known organic halogen compounds, we have found, are not effective stabilizers for methacrylonitrile polymers under heated conditions. For example, when tetrachlorethane is incorporated with polymethacrylonitrile and the composition is molded, the shaped article obtained is dark red in color. Similarly dark colored objects are also obtained by replacing the tetrachlorethane with 2,4-dichlorobenzene, with 2, 4, 6-trichlorophenol or with ortho-chlorophenol. Fluorine substituted organic compounds, trichloroacetic acid and tetrabromoethane have also been found to be without effect in stabilizing methacrylonitrile polymers.

It is, accordingly, an object of our invention to provide methacrylonitrile polymers and compositions thereof which are stabilized to heat. A further object is to provide a process for preparing such stabilized methacrylonitrile polymers. Other objects will become apparent from a consideration of the following description and examples.

In accordance with our invention, we accomplish the above objects by incorporating one or more of the stabilizers of our invention, namely, 1, 2, 3-tribromopropane, alpha-bromobutyric acid, 2-bromoethyl acetate or beta-propionitrile, with polymethacrylonitrile or with a copolymer of methacrylonitrile and one or more other monoethylenically unsaturated, polymerizable compounds, by a number of ways such as rolling, extruding, or kneading in plastic condition, mixing in the form of powdered polymer and stabilizer, or combining in common solvents, etc. In general, our invention is best carried out by incorporating the above mentioned stabilizers of our invention before the resin undergoes heat treatment, preferably by thorough incorporation in powdered form. For best results, the methacrylonitrile polymer or resin should be substantially free of impurities such as certain metals, inorganic acids and salts, etc., which can be controlled by reasonably careful polymerization and subsequent processing of the polymer or resin. Each of the stabilizers of our invention has its own optimum range of concentration in the particular methacrylonitrile polymer which may be found by routine heat tests. While concentrations of as high as 5%, based on the weight of the polymer, can be employed, the preferred range for our stabilizers is from about 0.5 to 1.5%. Amounts less than 0.5% are ineffective, while amounts exceeding 1.5% add but little extra effectiveness. Suitable monoethylenically unsaturated, polymerizable compounds which may be employed to prepare the copolymers of methacrylonitrile include vinyl carboxylic esters wherein the ester group is saturated such as vinyl acetate, vinyl propionate, vinyl butyrate, vinyl benzoate, acrylic acid and esters thereof such as methyl, ethyl, propyl, butyl acrylates, etc., methacrylic acid and esters thereof such as methyl, ethyl, propyl, butyl methacrylates, acrylamide, methacrylamide, N-alkyl acrylamides and N-alkyl methacrylamides wherein the alkyl group contains from 1 to 4 carbon atoms, styrenes such as styrene, γ-methylstyrene, o-methyl styrene, p-methylstyrene, and the like. The proportions of components in the copolymers can vary, for example, from 30 to 99% by weight of methacrylonitrile and from 70 to 1% by weight of the other monoethylenically unsaturated, polymerizable compound.

The polymerizations for preparing the methacrylonitrile polymers of our invention can be carried out in mass, in solution in an organic solvent such as acetone, acetonitrile, etc., or in aqueous dispersion or emulsion in the presence of a polymerization catalyst. Heat and actinic light such as ultraviolet light also accelerate the polymerizations. Suitable catalysts include the organic and inorganic peroxides such as benzoyl peroxide, acetyl peroxide, lauroyl peroxide, hydrogen peroxide, persulfates, e. g. alkali metal persulfates such as sodium and potassium persulfates, ammonium persulfate, etc., perborates, e. g. alkali metal perborates such as sodium and potassium perborates, ammonium perborate, etc. Azobis-nitriles and boron trifluoride are also effective polymerization catalysts. The amount of catalyst can be varied over a wide range, but advantageously from about 0.01 to 2.0% or even more, based on the total weight of monomer can be employed. Normal pressures are generally employed; however, good results are also obtainable at pressures substantially above or below normal atmospheric pressures. The temperature at which the polymerizations are carried out can vary from 30° C. to 100° C., preferably from 35° to 70° C. Batch or continuous processes can be employed. Where a continuous process is desirable, the monomers and other substituents including the stabilizing compounds of our invention can be continuously added in admixture or individually to the reaction system in the specified or calculated proportions and the polymer produced can be withdrawn from the system by suitable means as formed.

Where an aqueous dispersion or emulsion process of polymerization is employed, the presence also of a surface-active agent is advantageous. Suitable agents of this kind include fatty acid soaps, fatty alcohol sulfates such as sodium lauryl sulfate, potassium lauryl sulfate, etc., alkali metal salts of aromatic acids, e. g. sodium isobutylnaphthalene sulfonate, sulfosuccinic esters, sulfonated fatty acid amides, alkali metal salts of alkane sulfonic acids, sulfonated ethers, and the like. An activating agent such as an alkali metal sulfite or bisulfite, e. g. sodium, potassium, etc., sulfites and metabisulfites can also advantageously be added to the polymerization mixtures. If desired, chain length regulators can also be employed with advantage such as hexyl, cetyl, dodecyl, myristyl, etc. mercaptans.

The following examples will serve further to illustrate the manner in which we practice our invention.

EXAMPLES 1–10

These examples compare the effectiveness of the stabilizers of our invention with other compounds containing halogen.

10 g. samples of a carefully prepared, isolated and powdered polymethacrylonitrile obtained as set forth in the preceding, but containing no stabilizer, were intimately mixed with finely divided solid stabilizers in the concentrations given in the following table. The powder of each example was pressed between heated chrome-plated platens to a clear sheet 0.050 inch thick. Portions of each of these sheets were heated uniformly for 30 minutes at 200° C. The effectiveness of the various compounds to prevent discoloration is shown in the table.

*Table*

| Example | Stabilizer | Percent Concentration | Color of Heated Sample |
|---|---|---|---|
| 1 | none (blank) | | Dark Red. |
| 2 | 1,2,3-Tribromopropane | 1 | Colorless. |
| 3 | Alpha-Bromobutyric Acid | 1 | Do. |
| 4 | 2-Bromoethyl Acetate | 1 | Do. |
| 5 | Beta-Chloropropionitrile | 1 | Do. |
| 6 | Orthochlorophenol | 1 | Dark Red. |
| 7 | 2,4,6-Trichlorophenol | 1 | Do. |
| 8 | 2,4-Dichlorobenzoic Acid | 1 | Do. |
| 9 | Dichlorobenzene | 1 | Do. |
| 10 | Tetrachlorethane | 1 | Do. |

It will be seen from the above that the stabilizers of our invention represented by Examples 2, 3, 4 and 5 show no discoloration on heating, whereas other organic halogen compounds represented by Examples 6–10 are clearly ineffective as stabilizers for polymethacrylonitrile showing dark red discoloration, which result is no better than that of Example 1 which represents the blank and contains no stabilizer of any kind.

EXAMPLE 11

10 g. samples of a powdered copolymer consisting of 70% by weight of methacrylonitrile and 30% by weight γ-methystyrene were treated and heat tested with each of the compounds set forth as stabilizers in above Examples 1–10. The results obtained were about the same, i. e. the samples containing the stabilizers of our invention remained colorless on heating, whereas the other halogen containing organic compounds had discolored to a dark red appearance.

EXAMPLE 12

10 g. samples of a powdered copolymer consisting of 35% by weight of methacrylonitrile and 65% by weight of alpha-methylstyrene were treated and heat tested with each of the compounds set forth as stabilizers in above Examples 1–10. The results obtained were generally the same as found with the preceding examples. The samples containing the stabilizers of our invention remained colorless, whereas the other halogen containing compounds and the blank sample became dark red in color.

Proceeding in similar manner as described in the above, other copolymers of methacrylonitrile such as methacrylonitrile-vinyl acetate copolymers, methacrylonitrile-vinylbutyrate copolymers, methacrylonitrile-acrylamide copolymers, methacrylonitrile-N-methyl acrylamide copolymers, methacrylonitrile-N-methyl methacrylamide copolymers, methacrylonitrile-methacrylate copolymers, etc. can be stabilized to heat with the select group of stabilizers of our invention. While the invention has been illustrated with the methacrylonitrile polymers per se, it will be understood that inert filling materials, dyes, pigments, plasticizers, synthetic resins compatible therewith, etc. can be incorporated with the methacrylonitrile polymers containing the stabilizers of our invention to give similarly stabilized to heat compositions especially molding compositions. All of the stabilized compositions of our invention show greatly improved color and heat stability. Thus, our invention makes it possible to utilize the outstanding physical properties exhibited by homopolymers and copolymers of methacrylonitrile where they could not be used previously because of the poor color stability inherent in these polymers. The stabilized methacrylonitrile polymers of our invention are also excellent materials for preparing sheet materials such as photographic film support, and the like.

What we claim is:

1. A methacrylonitrile polymer containing in admixture therewith from 0.5% to 1.5%, based on the weight of the said polymer, of alpha-bromobutyric acid.

2. Polymethacrylonitrile containing in admixture therewith from 0.5% to 1.5%, based on the weight of the said polymer, of alpha-bromobutyric acid.

3. A copolymer comprising from 30% to 99% by weight of methacrylonitrile and from 70% to 1% by weight of alpha-methylstyrene and containing in admixture therewith from 0.5% to 1.5% by weight of alpha-bromobutyric acid.

4. A process for preparing a methacrylonitrile polymer stabilized to heat which comprises powdering the methacrylonitrile polymer and mixing therewith from 0.5% to 1.5%, based on the weight of the said polymer, of alpha-bromobutyric acid.

5. Polymethacrylonitrile containing in admixture therewith approximately 1% of its weight of alpha-bromobutyric acid.

6. A copolymer consisting of from 30% to 99% by weight of methacrylonitrile and from 70% to 1% by weight of alpha-methylstyrene and containing in admixture therewith approximately 1% of its weight of alpha-bromobutyric acid.

References Cited in the file of this patent

UNITED STATES PATENTS 2,676,946    McCurdy et al. _____ Apr. 27, 1954